UNITED STATES PATENT OFFICE.

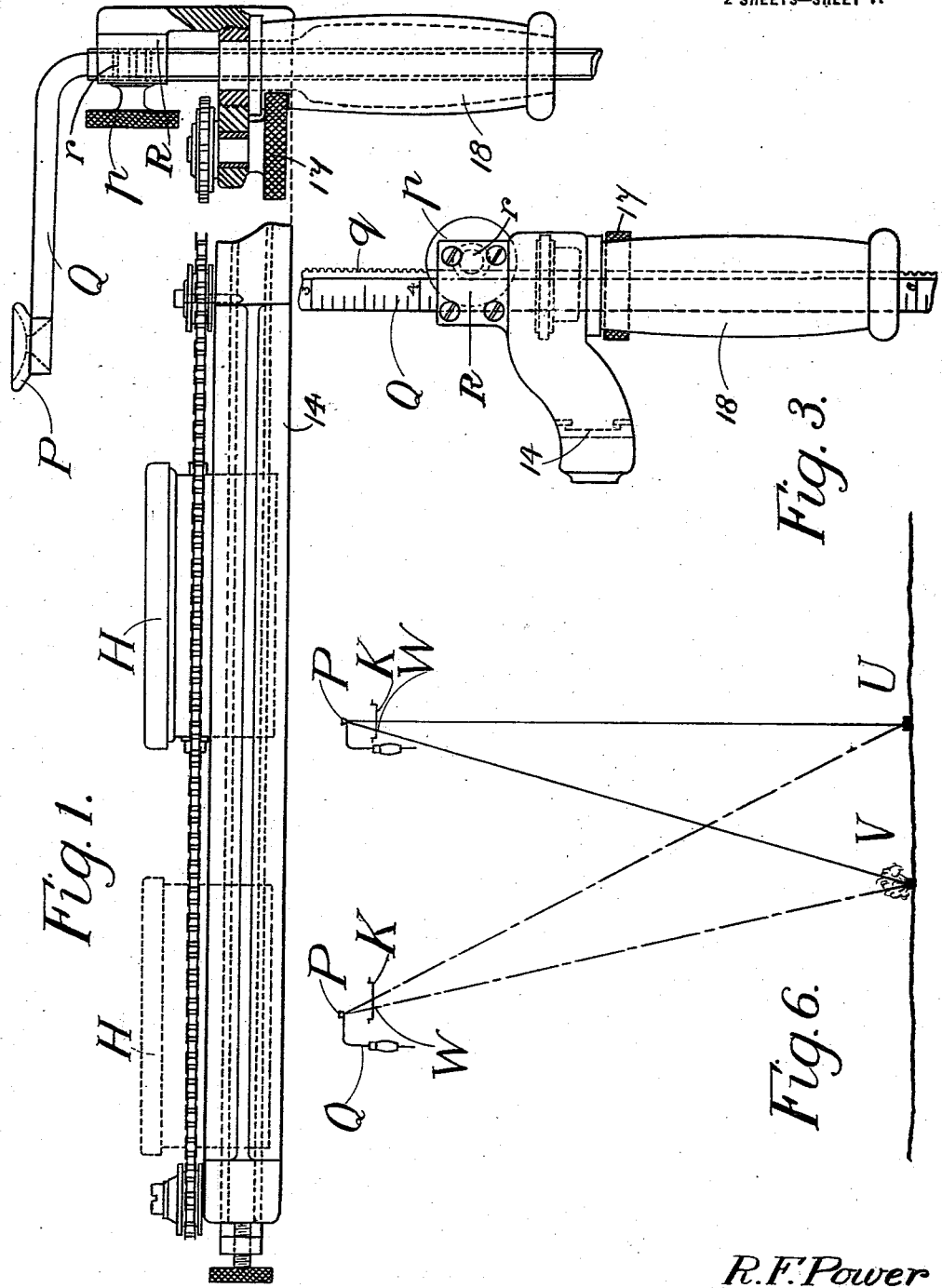

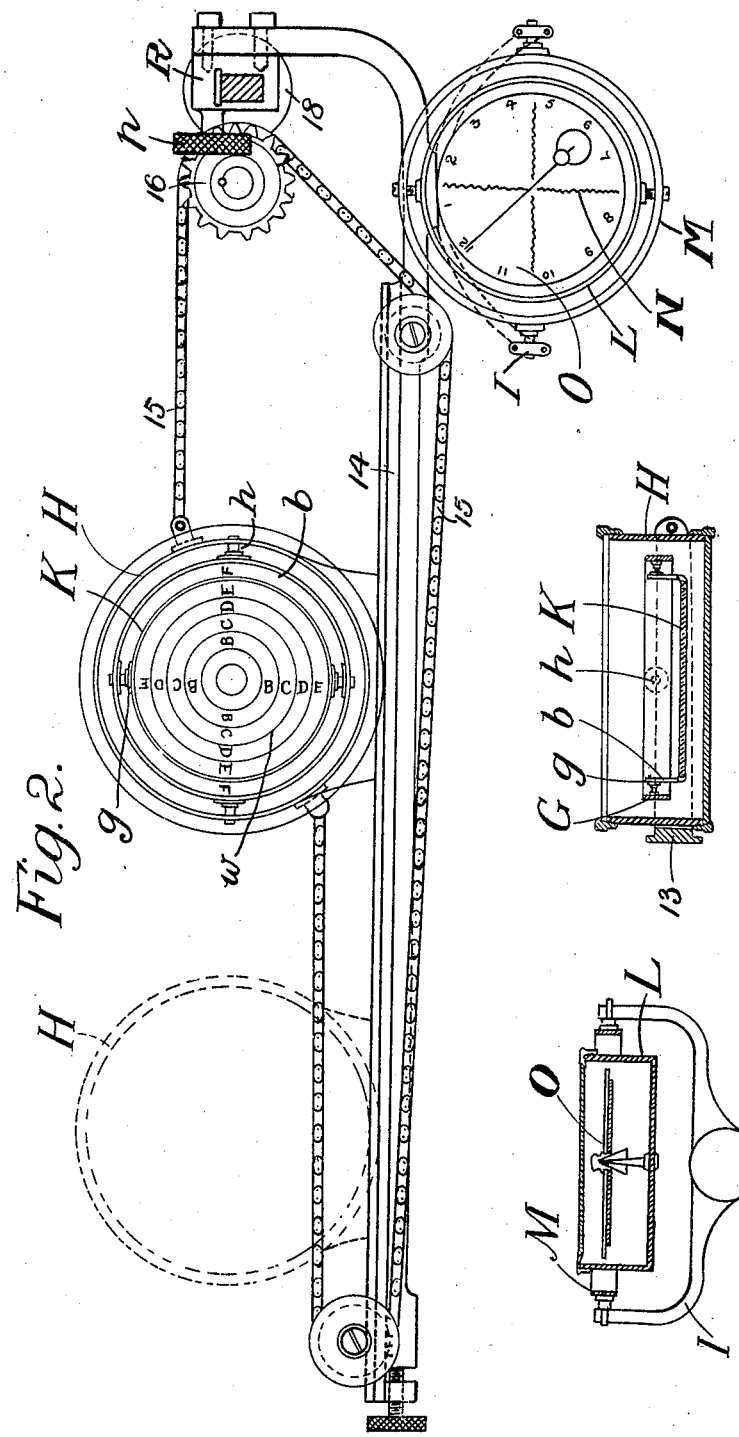

RICHARD FITZ POWER, OF DOVERIDGE, ENGLAND.

AERIAL-OBSERVATION INSTRUMENT.

1,311,994. Specification of Letters Patent. Patented Aug. 5, 1919.

Application filed August 6, 1917. Serial No. 184,725.

*To all whom it may concern:*

Be it known that I, RICHARD FITZ POWER, a subject of the King of Great Britain, residing at Doveridge, in the county of Derby and State of England, have invented certain new and useful Improvements in Aerial-Observation Instruments, of which the following is a specification.

The object of this invention is the construction of an instrument to enable an observer located at a height above a target, to observe the effect of artillery fire upon the target, or to observe the distance away from the target at which shells burst, together with the angular position of such bursting shells relatively to the target and to the true north and south line, and the invention is particularly directed to obtaining the results of these observations with greater accuracy than heretofore and in a form in which such observations can be quickly and conveniently transmitted to the place from which the artillery is fired, and from which place on the ground it may be as is usually the case, that the target cannot be seen, and such instrument according to this invention is particularly designed for use on aircraft.

In the aerial observation of the effect of such artillery fire as at present carried out, the position of the burst is observed on the ground, and then by means of its position relative to neighboring landmarks, the position of the burst is approximately located on the observer's map. By means of the known clock code, the observer signals down by wireless Morse the estimated position of the burst relative to the target.

In carrying out such observations, it is common practice to employ a transparent celluloid clock code disk which can be laid upon the observer's map, and this disk has a visible line extending diametrically through its center, one end of the line at the periphery being marked with the figure 12 and the opposite end of the line being marked with the figure 6, and the disk is divided into twelve parts, numbered from 1 to 12, similar to the divisions of a clock face; the 12-6 o'clock line is taken to be true north and south. Beyond this, the disk is marked with concentric circles at radial distances of 50, 100, 200, etc., yards, the circles being lettered A, B, C, etc. The target is taken to be the center of the disk and this celluloid clock code disk can be laid upon the observer's map with the 12-6 o'clock line in the direction of the true north, so that, when a round is fired, the observer notes its fall with reference to the imaginary circles and divisions on the ground and signals the results thus, A 2, C 7, etc., the circles upon the disk being marked according to the scale of the map in use.

Obviously, when the target is observed at an angle other than a right angle to the surface of the earth, foreshortening takes place and the observations made are incorrect, the other most common cause of error being the lack of suitable landmarks sufficiently close to the target which are marked on the map.

In an alternative method of carrying out artillery observations, the observer, before giving orders for the guns to shoot, measures from the map the distance between two easily distinguished points on the ground in the vicinity of the target, and also fixes in his mind's eye as far as possible, the location on the ground of the true north and south line running through the target.

This latter method makes more rapid observations possible, but in both methods the incessant and inevitable changes of direction and height of the observer's machine make accurate observing, especially in the case of the first few rounds on each target, which are frequently three or four hundred yards in error, an extremely difficult matter causing considerable waste of ammunition, which, in the case of the guns which rely on aeroplanes for observation of their fire, are usually of large caliber.

The objects of the invention are attained by mechanism as illustrated in the accompanying drawing, in which:—

Figure 1 is a side elevation and Fig. 2 is a plan of the invention arranged with the eye piece at a constant distance from the plane of the view glass for a given altitude; Fig. 3 is a detailed view showing the height bar mechanism; Fig. 4 is a detailed view showing the suspension of the view glass; Fig. 5 is a detailed view showing the attachment of the compass card; and Fig. 6 is a diagram illustrating the use of the invention as shown by Figs. 1 and 2.

Similar numerals refer to similar parts throughout the several views.

Referring to Figs. 1 to 6, K is a disk which is movable along a slide 14 by means of a chain 15 worked by a pinion 16 and the milled disk 17. The disk K is transparent and is carried by the case H attached to a foot 13 sliding in the slide 14. Within the case H a frame G is supported on gimbal pivots *h*, and within the ring G a frame *b*, which carries the transparent disk K, is supported on gimbal pins *g*. Thus the transparent disk K, which may be of glass, or celluloid, is supported so as always to be horizontal. The disk K is marked, as shown in Fig. 2, with the ordinary clock code, having a number of circles A, B, C, D, E, F spaced with a predetermined scale to indicate certain distances from the center of the disk in relation to the real distances on the surface of the earth from a given point, say, a target at the center of the area. Attached to the frame 14 is a bracket I, carrying the gimbal ring M, in which further is suspended the box L carrying the compass card O; the compass card O is marked with angular divisions corresponding to the twelve points of a clock face, the true north-south line of the compass being represented by the 12-6 o'clock line of the clock face. The corrugated lines at right angles to each other are marked on the transparent top of the box L, and serve to indicate the fixed position corresponding to the lines A, B, C, D, E, F marked at right angles to each other on the disk K. P is an eye piece carried by the height bar Q supported in the block R by means of a toothed rack *q* and a pinion *r*, which may be turned by the milled disk *p*.

The height bar Q is arranged at definite heights corresponding to the altitudes of an aeroplane or other aircraft on which the instrument is used, and, being once set, retains the eye piece P at a definite distance from the center of the disk K, and, as will be seen from the drawing, the eye piece P will always remain at the same distance away in reference to the parallel plane of the disk surface.

The eye piece P is always held above the box H in the slide 14, and the apparatus may be conveniently carried by the handle 18 attached to the slide, the box H being traveled to any point of the slide 14 necessitated by the position of a target below it, so that the said target can be seen from the eye piece P through the center of the disk K. The bar Q is marked with a scale which enables it quickly to be set to the correct height for a given altitude, and so as to correct the instrument if the aviator finds it necessary to observe from a greater height when he makes his flight.

Referring to Fig. 6, it will be seen that if a target U is viewed through the disk K when vertically above it at a given altitude, it will be seen through the center of the disk and with the distance P, K bearing a known proportion to the distance P, U, or K, U, and, supposing a shell-burst occurs at the point V, it will be seen through a point of the disk K, say, as shown by the point W on the circle D in Fig. 2, from which it will be known that the point V is distant from the target U a distance equivalent to that represented by four divisions of the disk K, say, 400 yards when the scale is marked with one division representing 100 yards on the earth's surface. If now the observer moves in his aeroplane at the same altitude so as to reach the position shown by K on the left hand side of Fig. 6, the disk K has also to be moved from the height bar Q in order to retain the target in view through the center of K. This results in the distance from P to the center of K being extended automatically, and the proportion, therefore, of P, K, (that is, the center point of K) to K, U, remains correct, as also the distance to scale of the point W from the center of K.

It will be seen, however, that the disk K by itself does not indicate in what direction the shell-burst V is wide of the target U; by comparison, however, of the angular position of the point W on the circle D through which the shell-burst is seen with regard to the cross lettering A, B, C, D, E, F indicated on the glass top of the compass box L by the corrugated lines N, he can readily estimate the position of the point W with regard to the clock compass face O, and can thus also convey its position to the battery observer, who is furnished with a map having the true north-south line, of course, thereon. Taking the point W, for instance, at the position shown in Fig. 2, it is easy, on comparison with an imaginary point in the same position on the compass card O, to see that its angular position is almost exactly at 9 o'clock. A message, therefore, indicating 400 yards wide at 9 o'clock, shows the battery observer exactly where and how much the shell-burst is wide of the target, and he can correct his guns accordingly. Intermediate distances can of course be marked on the transparent disk K, and are usually done so near the center.

Though mentioned as being adapted for support by the handle 18 in the hands of the observer, the apparatus will normally be fitted to supports on the side of an aeroplane, or the device might be arranged to occupy a position with a view window in the bottom surface of the fuselage of an aeroplane, or the observation car, suspended or otherwise, of an airship.

By the use of this invention as set forth above, more accurate observations can be made than have hitherto been made by observers relying on their own individual capacity unaided by instruments.

While I have described in the foregoing specification the construction of parts and operations preferred, I am aware that numerous changes of construction and operation may be made without departing from the spirit and scope of the invention, and I, therefore, do not wish to be understood as limiting myself by the positive terms employed in connection with the description, excepting such as the state of the art may require.

Having now set forth the object and nature of my invention and forms of apparatus embodying the same, and having explained its construction, function, and mode of operation, what I claim as new and useful and of my own invention, and desire to secure by Letters Patent, is:—

1. In an aerial observation instrument, a support, a transparent plate provided with position identification lines, and universally mounted thereon so as always to remain horizontal, and sighting means vertically adjustable on said support and adapted to sight objects through said plate.

2. In an aerial observation instrument, a support, a transparent plate provided with position identification lines, and universally mounted thereon so as to always remain horizontal, a member with a horizontal surface acting as a magnetic compass card, and sighting means vertically adjustable on said support enabling an observer to view through the said plate one or more objects directly in their relation to the said position identification lines, whereby the angular relation of said objects to a line on the compass card coinciding with, or having a fixed relation to, the north-south line of same may be estimated, and consequently in similar relation thereto as the relation of the objects to a north-south line of the earth at the particular locality.

3. In an aerial observation instrument a support, a transparent plate provided with clock code circles, and universally mounted thereon so as always to remain horizontal, and sighting means vertically adjustable on said support and adapted to sight objects through said plate directly in their relation to the said clock code circles.

4. In an aerial observation instrument, a support, a transparent plate provided with clock code circles, and universally mounted thereon so as always to remain horizontal, a member with a horizontal surface acting as a magnetic compass card having hour numbers of a clock face indicated thereon with the 12-6 o'clock line coinciding with the north-south line of the compass, and sighting means vertically adjustable on said support enabling an observer to view an object through the center of the said clock code circles and a second object away from the center directly in its distance relation to the center of said clock code circles, and whereby the angular relation of the second object to the pivot point on the north-south line of the compass card, corresponding also to the center of the clock code circles, may be estimated.

5. In an aerial observation instrument, the combination of an eye piece, a support, a transparent plate provided with position identification lines, and universally mounted thereon so as always to remain horizontal, and means for varying the position of the said plate so that its distance from the eye piece is proportionate to the distance of the eye piece from the object observed when seen through the center of the said plate.

6. In an aerial observation instrument, the combination of an eye piece, a support, a magnetic compass card upon which are indicated angular position identification points, a transparent member with a horizontal surface marked with fixed angular direction lines immediately above the said compass card, a transparent plate provided with position identification lines of predetermined scale and direction lines or points of similar angularity to the direction lines on the horizontal surface above the compass card, and means for varying the position of the said plate so that its distance from the eye piece is proportionate to the distance of the eye piece from the object observed when seen through the center of the said plate, whereby the angular position of a second object in the field of view may be estimated with regard to the compass points, while its distance position from the first object may be estimated from the scale position identification lines.

7. In an aerial observation instrument, a transparent plate provided with clock code circles to a known scale, a case having gimbal supports for the said plate, a slide carrying the said case, means operable by a hand wheel for traversing the case along the slide at will, an eye piece, a height bar carrying said eye piece, a handle or holder for the instrument supporting said height bar, means operable by a hand wheel for traversing the said height bar up and down in its support, and a compass supported in gimbals attached to a convenient part of the instrument, the said compass face being marked with clock face numbers, all substantially as and for the purpose set forth.

8. In an aerial observation instrument, a transparent plate provided with clock code circles to a known scale and angular identification markings, a case having gimbal supports for the said plate, a slide carrying the said case, a sprocket wheel and chain traversing the said case along the said slide, an eye piece, a height bar carrying said eye piece, a handle for the instrument supporting said height bar, a rack and pinion gear traversing the said height bar up and down in its support, and a compass and box supported in gimbals attached to the instrument, the said compass face being marked with clock face numbers and the top of the compass box with angular identification markings corresponding to those on the transparent plate substantially as described herein.

In testimony whereof I affix my signature.

RICHARD FITZ POWER.

Copies of this patent may be obtained for five cents each, by addressing the "Commissioner of Patents, Washington, D. C."